Sept. 4, 1951  R. H. WELLS ET AL  2,566,711
DISPLAY DEVICE FOR WEIGHING APPARATUS
Filed April 9, 1946  2 Sheets-Sheet 1
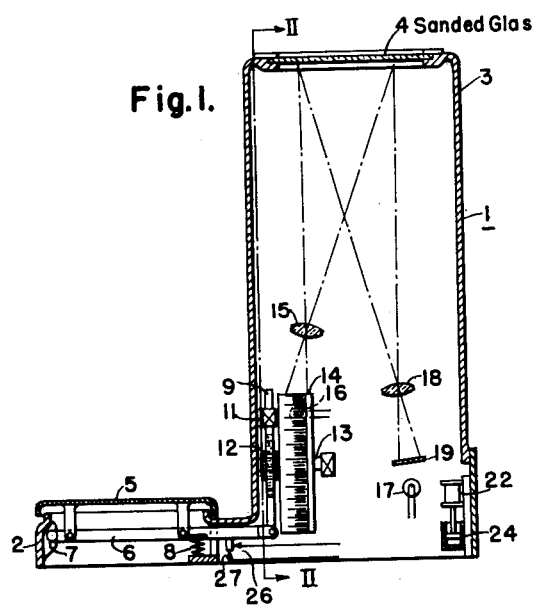
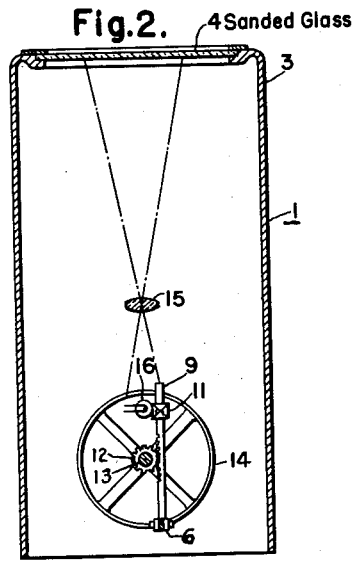
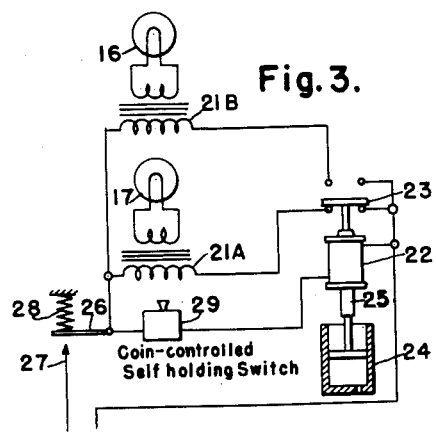
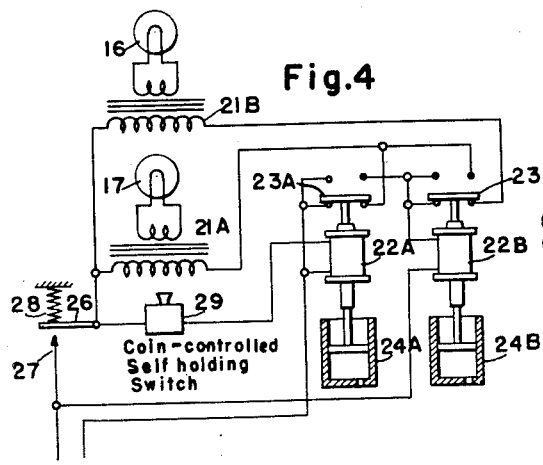
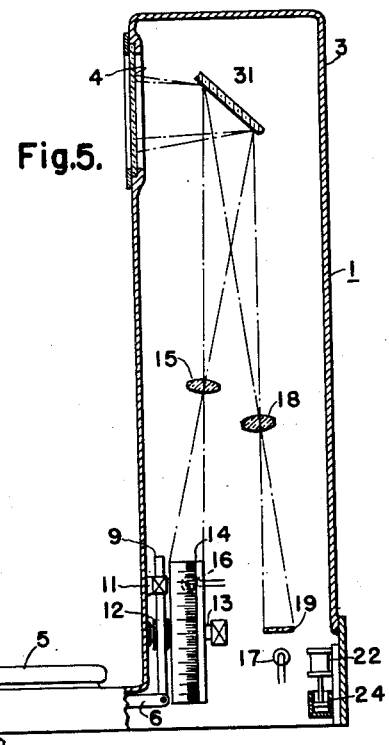
INVENTORS
Richard H. Wells &
Carl C. Hein
BY F. W. Lyle
ATTORNEY Sept. 4, 1951 R. H. WELLS ET AL 2,566,711
DISPLAY DEVICE FOR WEIGHING APPARATUS
Filed April 9, 1946 2 Sheets-Sheet 2
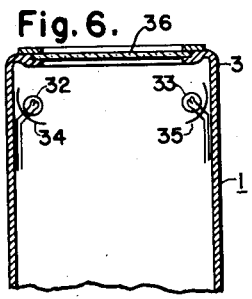
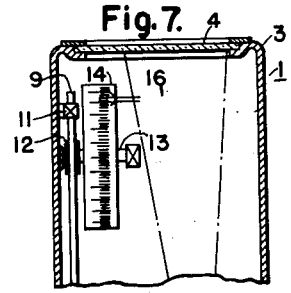
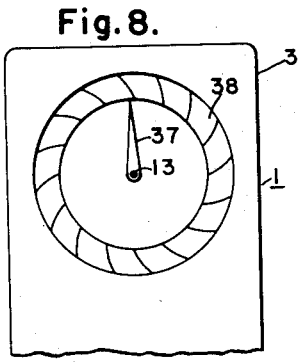
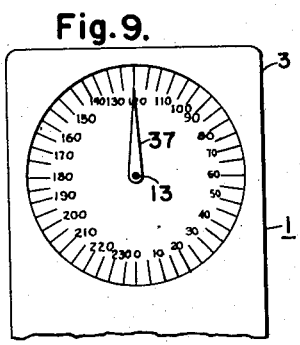
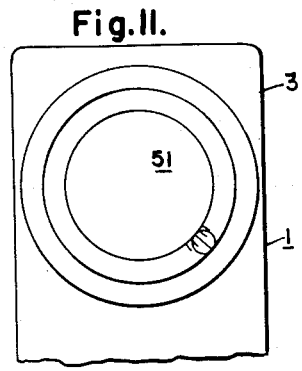
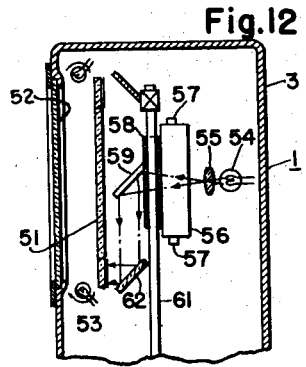
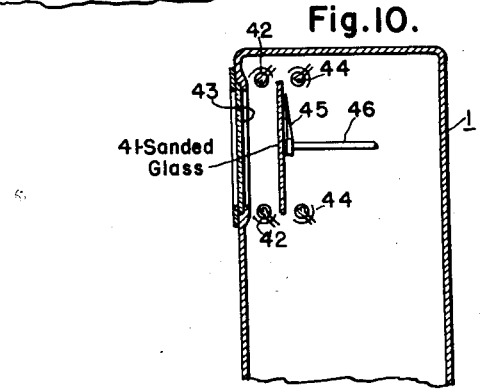
INVENTORS
Richard H. Wells &
Carl C. Hein
BY
ATTORNEY Patented Sept. 4, 1951

2,566,711

UNITED STATES PATENT OFFICE 2,566,711

DISPLAY DEVICE FOR WEIGHING APPARATUS

Richard H. Wells, Mount Lebanon, and Carl C. Hein, Wilkinsburg, Pa.

Application April 9, 1946, Serial No. 660,686

4 Claims. (Cl. 40—28)

Our invention relates to weighing devices and in particular relates to devices in which advertisements are displayed on the screen of a weighing scale on which individuals may weigh themselves.

One object of our invention is to provide a weighing scale in which an advertisement is first displayed before the eyes of a user and then a reading of his weight is furnished.

Another object of our invention is to provide a weighing scale in which any desired or other display is first thrown on a screen and then the weight of the user is displayed on the same screen after a delay sufficient to insure the advertising has been read.

In general one of the principal objects of our invention is to concentrate the attention of an individual on a display area on which he expects some information which is of interest to him, such as for example, his weight, to be displayed and to delay the furnishing of this information for a brief interval while advertising matter is exhibited on the display area.

Still another object of our invention is to provide a novel type of weighing device well adapted for display advertising.

Other objects of our invention will become apparent on reading the following description taken in connection with the drawings in which Figure 1 is a view partly in elevation, and partly in cross section, of one form of advertiseing scale embodying the principles of our invention.

Fig. 2 is a view partly in cross section the line II—II in Fig. 1.

Fig. 3 and Fig. 4 are schematic diagrams of certain electrical circuits employed in the device of Fig. 1.

Fig. 5 is an elevational view, partly in cross section, of a modified form of the weighing scale shown in Fig. 1.

Fig. 6 is a sectional view of the screen-end of a different form of weighing scale adapted to embody certain principles of our invention.

Fig. 7 is a sectional view of the screen-end of a weighing scale embodying in a still different form certain principles of our invention.

Fig. 8 is a view of the display screen in one position, and Fig. 9 a view of the same display screen in another position of a weighing scale constituting a still different embodiment of our invention.

Fig. 10 is an edgewise view of the display screen of a weighing scale constituting a still further embodiment of our invention; and Figs. 11 and 12 are respectively a view partly in elevation and partly in section, and a view at right angles to Fig. 11, of a still different modification of our invention.

There is a wide use in public places of scales, usually of a simple platform type, on which any member of the public may weigh himself, usually by depositing a coin after stepping on the weighing platform. In some scales advertising matter is continuously displayed somewhat on the scale structure, though generally at some point different from that at which the user's weight is to be displayed. One defect of such an arrangement is the lack of anything to attract the user's attention to the advertisement. The latter is in fact less effective than an ordinary placard or sign. In fact the user's attention is actually distracted from any such advertising because he knows that his weight will be displayed at some different area; he knows that it will be so displayed almost immediately; and he naturally withdraws his attention from all surrounding objects and concentrates them on the point at which his weight is to be shown.

Our invention constitutes a marked improvement on such arrangements by inducing the scale user to concentrate his attention on a viewing screen of limited area; thereafter displaying advertising matter on that area while the user's attention is fixed thereon in expectation of seeing his weight displayed; and then, only after a delay sufficient for the advertisement to be read, displaying the weight which the user really desires to see.

Such being one of the basic principles of our invention their embodiment as shown in Figs. 1 to 5, comprises an enclosing case 1, which may for example be of sheet metal, and comprise a low platform support 2 and a vertical casing 3, having at its upper end a display screen 4 of sanded glass or the like positioned in a convenient location to be seen by a user stepping on the platform support 2. The platform support 2 is covered by a platform 5 on which the scale user steps, and which thereupon actuates a weighing mechanism housed by the casing 1 to display the user's weight on the screen 4. While any suitable mechanical arrangements may be used for supporting the platform 5 and causing it to display the user's weight we show for purpose of illustration the platform 5 as pivotally supported on a lever-bar 6 supported from the casing 2 by a hinge 7. The lever-bar 6 is biased upward by a suitable spring 8 having its lower end supported by the casing 2. The end of the lever-bar 6 projects inside the casing portion 3 where it is hinged to a movable vertical bar 9 journaled in a support 11 affixed to the casing 3. A series of rack-teeth on the rod 9 engage a pinion 12 which is affixed to a horizontal shaft 13 supported in suitable bearings affixed to the casing 3. The shaft 13 carries a wheel 14 having a suitably wide rim of translucent material on which is marked the numbers and dividing lines of a scale calibrated to register the weight of anybody standing on the cover 5. A moment's consideration will show that when the cover 5 moves downward under the imposition of any weight the lever-bar 6 will be forced downward against the bias of the spring 8 by an amount corresponding to the weight. The rod 9 will be pulled downward by the free end of the lever-bar 6, and the engagement of its rack-teeth with the pinion 12 will rotate the wheel 14 on the shaft 13. The numbers and scale markings on the rim of wheel 14 will thus be moved, and the latter will come to rest with a reading corresponding to the weight on the cover 5 displayed on the portion of the rim which is uppermost and provided with a suitable pointer positioned directly above the supporting shaft 13. The calibration of the scale on the rim of wheel 14 to correspond with different weight placed on the cover 5 is a simple matter easily carried out by any ordinary worker.

A view of the portion of the scale immediately at the top of wheel 14 at any time is projected onto the screen 4 by a suitable optical system symbolically represented by the lens 15 and the light source 16, which latter is positioned directly below the inner periphery of wheel 14 and directly above the shaft 13. The design of optical systems capable of projecting an enlarged image of the scale on wheel 14 onto the screen 4 is a relatively simple matter well within the capacity of man skilled in the optical art; hence it will not be described in detail here.

Also within the walls of the casing portion 3 is positioned a second light source 17 and a second optical system 18 adapted to project onto the screen 4 any scene, view, or printed matter carried on a slide 19. Again the details of the optical system 17, 18, 19 are so well known that the detailed description may be omitted.

It is obvious that the slide 19 may for example be a moving picture film and that it may be provided with suitable sound reproducing auxiliaries (not shown).

The light screens 16 and 17 are normally dark and are energized in a sequence about to be described when a user steps on the platform 5.

The electrical circuits for energizing the light sources 16 and 17 are shown schematically in Figs. 3 and 4. They comprise voltage sources such as transformer primaries 21A and 21B connected in series with the energizing winding of a relay 22 which has a bridging member 23 across a pair of contacts in series with the primary 21A. The latter energizes light source 17 when the relay 22 is in its deenergized position as shown in Fig. 3. The relay 22 is provided with a time-delay device 24 which allows the movable core 25 to be actuated only slowly to cause bridging member 23 to break the circuit to light source 17 and immediately thereafter to close a circuit to primary 21B which energizes light source 16 after relay 22 is actuated. The primaries 21A and 21B are connected to the power supply lines through a switching device comprising a hinged blade 26 and a stationary contact 27. The hinged blade 26 is held out of contact with the stationary contact 27, thereby maintaining both the light sources 16 and 17 deenergized by a biased spring 28 which pulls it upward against lever-bar 6 when there is no weight on the platform 5. As soon as anyone steps on the platform 5 the lever-bar 6 is moved downward and permits switch-blade 26 to close the circuit through relay 22, bridging member 23 and primary 21A. The consequent energization of light source 17 causes the advertising, or other matter on slide 19 to be flashed onto the screen 4 and to remain displayed there until the time delay device 24 permits bridging member 23 to break the circuit of light source 17 and complete the circuit energizing light source 16. Thus after a slight time delay the magnitude which may be set at will by suitably adjusting time-delay device 24 the advertising matter is flashed off from screen 4 and the weight indicated by the portion of the scale on wheel 14 which is uppermost is projected onto screen 4 where the person standing on platform 5 can see it.

While we have described the relay 22 as responding to the mere presence of a weight on platform cover 5, it will be obvious that a simple coin-controlled self-holding switch 29 may be inserted between switch 26—27 and relay 22 so that energization of the latter and the sequence of steps just described as consequent thereto will be initiated only when the person standing on platform 5 drops a coin in the coin-control slot.

As soon as the user steps away from platform 5 spring 8 moves lever-bar 6 to its normal unloaded position thus returning the scale on the rim of wheel 14 to its zero-position and causing spring 28 to lift switch blade 26 to open the circuit of relay 22 and permit the entire electrical system to return to initial condition which it occupied when the above cycle of movements began.

It will be obvious that the above described arrangements may be modified to retain the display of the advertisement while the weight is being shown by short circuiting the contacts initially bridged by the member 23, so that when the latter moves upward the circuit of light source 17 is not broken. It will likewise be seen that by such a relay system as is shown in Fig. 4 the screen 4 may be made first to display the advertisement, then for a limited time to display the weight, and thereafter again return to the display of the advertisement.

In the Fig. 4 arrangement the switch blade 26 is permanently connected to the common terminal of primaries 21A and 21B and thence through the energizing winding of relay 22A to the other side of the power supply. The relay 22A is provided with a time-delay device 24A and has a bridging member 23A which, in its de-energized position, connects the second terminal of primary 21A to said other side of the power supply. Light source 17 is thus energized as soon as anyone steps onto platform 5, and this situation continues until relay 22A is permitted by time-delay device 24A to move bridging bar 23A to its upper position.

In Fig. 4 there is also provided a second relay 22B having a time-delay device 24B and a bridging member 23B. When the bridging member 23A moves to its upper position it connects the energizing winding of relay 22B across the power supply and starts its time cycle. Initially, however, the bridging member 23B is in its lower position and connects the primary 21B across the power supply thereby energizing light source 16 instead of light source 17 and causing an indication of the user's weight to replace the advertisement on the screen 4. This situation persists until time-delay device 24B permits bridging member 23B to move to its upper position, whereupon primary 21B and light source 16 are de-energized, and primary 21A and light source 17 are re-energized to re-display the advertisement in place of the weight indication.

When the user steps off from scale platform 5 the whole Fig. 4 system returns to the de-energized condition from which it has been described as starting. It is thus adapted to display a sequence comprising advertisement-weight-advertisement. The duration of the respective displays of advertisement and weight may, of course, be varied by adjusting the time-delay device 24A and 24B.

By simply short circuiting the lower contacts of the relays 22A and 22B the Fig. 4 arrangement will carry out a sequence comprising first the advertising, then the advertising plus the user's weight, then the advertising alone again. These relay systems for the above described sequences will be seen to be applicable to all the display arrangements shown in Figs. 1 through 12.

Fig. 5 shows a scale arrangement similar to the one shown in Figs. 1 through 4 except that screen 4 is vertical and that the light from the optical systems 15 and 18 is reflected onto it by suitable plane mirror 31 positional at a 45 degree angle.

Fig. 6 shows still another modification of our invention in which the optical system 17, 18 and 19 is replaced by a simple pair of light sources 32, 33 furnished with reflectors 34, 35 and energized in the same way as light source 17 in Fig. 1. The screen 4 of Fig. 1 is replaced by a screen 36 having a suitable advertisement on its interior surface which is normally invisible when the light sources 32 and 33 are unlighted. When a user steps on the platform 5 light sources 32 and 33 are energized to display the advertisement and thereafter the user's weight is projected on the screen 36 by an optical system similar to that embodying members 15 and 16 in Fig. 1.

Fig. 7 shows still another modification of our invention in which the optical system 15 of Fig. 1 is omitted, the wheel 14 being raised so that its rim is positioned just below the screen 4. The wheel 14 may obviously be easily positioned thus simply by making the rod 9 long enough so that shaft 13 can be raised to a sufficient height. Energization of the light source 16 then renders the scale on the rim of wheel 14 visible through translucent screen 4.

Figs. 8 and 9 illustrate a still different modification of our invention in which the indication of weight, instead of being projected by an optical system through a translucent wheel rim are given by a pointer moving about a dial with a circular scale adjacent its rim. Such a pointer may obviously be attached to a shaft similar to the shaft 13 described in connection with Fig. 7. In the arrangement of Fig. 8, the scale is concealed from the user by an iris diaphragm 38 of type too well known to require detailed description. Simple movement of the actuating arm of the diaphragm by the upwardly extending shaft of a relay such as relay 22 shown in Fig. 3 will open the diaphragm to expose the scale and weight indicated thereon as soon as such movement is permitted by the time-delay device 24. The electrical connection of such a relay could then be similar to those of Fig. 3 omitting the light sources 16 and 17, the transformers 21A and 21B and the bridging member 23.

Fig. 10 shows the edge view of a translucent screen positioned in a vertical plane similar to the screen 4 in Fig. 5. The face of the screen 41 which faces outward toward the user of the scale is provided with advertising matter printed in semi-transparent medium. Light sources with electrical connections similar to sources 17 in Fig. 1 are positioned in front of the screen 41 and render the advertising matter plainly visible through a translucent window 43 only when they are energized. Behind the screen 41 is positioned a set of light sources 44 having electrical connections similar to the light sources 16 in Fig. 3. The rear side of the screen is provided with suitable markings of a calibrated weight-scale; and a pointer 45 actuated by a shaft 46, supported and actuated exactly as is the shaft 13 in Fig. 1, moves over the rear face of the scale 41 to indicate the user's weight. This indication becomes visible to the user only when the light sources 44 are energized, after a time delay, by a relay which may be similar to relay 22 in Figs. 1 and 5.

Fig. 12 shows a novel type of optical system adapted to display advertising matter on a central area of a vertical screen which faces the scale user, and to subsequently display weight indication on an annular scale surrounding such area. Thus the screen 51 has a central circular area having advertising matter or the like printed on its outer face. A calibrated scale is imprinted on the annular portion surrounding the central area. The screen 51 is supported within a housing 1 which has a translucent window 52 covering the area of the screen 51. Light sources 53, having electrical connections similar to light source 17 in Fig. 1, are provided to render this advertising matter visible through window 52 only when they are energized.

A light source 54 having electrical connections similar to light source 16 in Fig. 1 projects a beam through an optical system symbolized by lens 55 similar to the optical system 15 in Fig. 1 and through a central hole in a bearing-member 56 fixed by any suitable supports 57 to the casing 1. The bearing-member 56 rotatably supports an annular pinion 58 analogous to the pinion 12 in Fig. 1 and, like the latter having a toothed periphery. The pinion 58 supports at an angle of 45 degrees to its central axis a mirror 59 and its toothed rim engages a vertical shaft 61 analogous to, and actuated in the same way as, the rod 9 in Fig. 1. Like the latter vertical movements imparted to member 61 when any weight is placed on the platform cover 5 (not shown) rotates the pinion 58 and the attached mirror 59 about the axis of the optical system 54—55.

The beam projected by the optical system 54—55 thus passes through suitable openings in the members 56—58, directly along the central axis of the annular pinion 58 and is reflected in a radial line at a right angle to that axis by the mirror 59. The angular position about the axis of pinion 58 which this reflected ray will occupy depends upon the position to which the pinion 58 is turned by movement of the vertical rod 61.

An annular mirror 62 is positioned coaxial with the pinion 58 and is arranged to intercept the above mentioned radial light ray and to reflect it parallel to the axis of pinion 58 into incidence with the annular scale at the periphery of screen 51. The mirror 59 is made of such form that the light projected by it onto the annular scale of screen 51 is a bright circular area crossed by a relatively narrow index line. The position of that line on such scale will obviously be determined by the movements of the vertical rod 61 in response to the weight positioned on the platform 5 and will accordingly give an indication on such scale of the weight placed on the platform 5.

Fig. 11 illustrates the appearance of the screen 51 when light source 54 is energized and light source 53 is deenergized.

While we have specifically illustrated the broader principles of our invention by apparatus which furnishes the user with information as to his weight, the furnishing of other types of information of interest and the communication of information generally are within the purview of our invention. The publication of other subject matter than advertising is likewise within the scope of the broader principles we have in mind.

Having thus described our invention, what we claim as new therein and desire to secure by Letters Patent is:

1. In combination with means for determining weight, means to indicate said weight, display means operative only when illuminated, and means responsive to said weight determining means, to illuminate said display means and, only after a predetermined time interval subsequent thereto, to illuminate said indicating means.

2. In combination with a platform scale for displaying on a confined screen an indication of the weight of a person stepping on the said platform, light projecting means for displaying advertising matter on said screen, means for activating said light projecting means to display said matter only in response to deposition of a weight on said platform, and means for deactivating said light projecting means after a predetermined time and then displaying said weight indication on said screen.

3. In a platform scale displaying on a confined screen an indication of the weight of a person taking a position on said platform, an optical system embodying a normally deenergized first light source for displaying advertising matter on said screen, means for energizing said light source only in response to imposition of a weight on said platform, a second optical system for displaying said weight indication on said screen and embodying a normally deenergized second light source, and means for deenergizing said first light source after a predetermined duration of energization and for then energizing said second light source.

4. Means to determine a quantity of interest in response only to voluntary actuation by a user, means to indicate said determination to said user only when illuminated, means to display advertising only when illuminated, and means responsive to said actuation to illuminate only said display means and, after the lapse of a predetermined time, to illuminate said indicating means.

RICHARD H. WELLS.
CARL C. HEIN.

REFERENCES CITED

The following references are of record in the file of this patent:

UNITED STATES PATENTS

| Number | Name | Date |
|---|---|---|
| 595,541 | Hollen | Dec. 14, 1897 |
| 889,212 | De Barry | June 2, 1908 |
| 1,182,952 | Wilke | May 16, 1916 |
| 1,371,860 | Charles | Mar. 15, 1921 |
| 2,351,238 | Teuber | June 13, 1944 |
| 2,419,041 | Stewart | Apr. 15, 1947 |